(12) United States Patent
Chen et al.

(10) Patent No.: US 6,317,531 B1
(45) Date of Patent: Nov. 13, 2001

(54) OPTICAL CROSS-CONNECT UTILIZING METAL/HYDRIDE MIRRORS

(75) Inventors: Yong Chen, Palo Alto; Long Yang, Union City; Shih-Yuan Wang, Palo Alto, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/397,821

(22) Filed: Sep. 17, 1999

(51) Int. Cl.[7] .................................. G03B 6/42; G03B 6/10
(52) U.S. Cl. ................................ 385/17; 385/18; 385/19; 385/16; 385/130; 385/131
(58) Field of Search ................................ 385/5, 17, 18, 385/19, 129, 130, 131, 16; 359/275

(56) References Cited

U.S. PATENT DOCUMENTS

| | | | |
|---|---|---|---|
| 4,988,157 | * | 1/1991 | Jackel et al. .............................. 385/17 |
| 5,905,590 | * | 5/1999 | Van Der Sluis et al. ............. 359/275 |
| 5,970,187 | * | 10/1999 | Notten et al. ............................ 385/16 |

* cited by examiner

Primary Examiner—Georgia Epps
Assistant Examiner—Gary O'Neill

(57) ABSTRACT

An optical cross-connect switch for routing light signals between N input optical fibers and M output optical fibers. The switch includes an NxM array of optical switching elements, each optical switching element routing a light signal from one of the input optical fibers to one of the output optical fibers. Each optical switching element includes a layer of a switching material, first and second transparent electrodes overlying the layer of switching material, and a layer of hydrogen reservoir material adjacent to the layer of switching material. The switching material has first and second states. The switching material is transparent to the light signals in the first state, and the switching material reflects the light signals in the second state. The state of the switching material is determined by the concentration of hydrogen in the material. The hydrogen reservoir material supplies hydrogen to the switching material when a first potential difference is applied between the first and second electrodes and absorbs hydrogen from the switching material when a second potential difference is applied between the first and second electrodes. The switching material preferably includes a material chosen from the group consisting of alkali, alkaline-earth, rare-earth metals, and the hydrides thereof.

6 Claims, 2 Drawing Sheets

OPTICAL CROSS-CONNECT UTILIZING METAL/HYDRIDE MIRRORS

FIELD OF THE INVENTION

The present invention relates to optical switching devices, and more particularly, to cross-connect switches for routing light signals.

BACKGROUND OF THE INVENTION

Optical fibers provide significantly higher data rates than electronic paths. However, effective utilization of the greater bandwidth inherent in optical signal paths requires optical cross-connect switches. In a typical telecommunications environment, switching of signals between optical fibers utilizes an electrical cross-connect switch. The optical signals are first converted to electrical signals. After the electrical signals have been switched, the signals are again converted back to optical signals that are transmitted via the optical fibers. To achieve high throughput, the electrical cross-connect switches utilize highly parallel, and highly costly, switching arrangements. However, even with such parallel architectures, the cross-connect switches remain a bottleneck.

A number of optical cross-connect switches have been proposed; however, none of these have successfully filled the need for an inexpensive, reliable, optical cross-connect switch. One class of optical cross-connects depends on wavelength division multiplexing (WDM) to affect the switching. However, this type of system requires the optical signals being switched to have different wavelengths. In systems where the light signals are all at the same wavelength, this type of system requires the signals to be converted to the desired wavelength, switched, and then be re-converted to the original wavelength. This conversion process complicates the system and increases the cost.

A second type of optical cross-connect utilizes total internal reflection (TIR) switching elements. A TIR element consists of a waveguide with a switchable boundary. Light strikes the boundary at an angle. In the first state, the boundary separates two regions having substantially different indices of refraction. In this state the light is reflected off of the boundary and thus changes direction. In the second state, the two regions separated by the boundary have the same index of refraction and the light continues in a straight line through the boundary. The magnitude of the change of direction depends on the difference in the index of refraction of the two regions. To obtain a large change in direction, the region behind the boundary must be switchable between an index of refraction equal to that of the waveguide and an index of refraction that differs markedly from that of the waveguide.

Prior art TIR elements that provide a large change in index of refraction operate by mechanically changing the material behind the boundary, and hence, have relatively slow switching speeds. In addition, mechanical devices have reliability problems. For example, U.S. Pat. No. 5,204,921, Kanai, et al describes an optical cross-connect based on an array of crosspoints in a waveguide. A groove at each crosspoint, may be switched "on" or "off," depending upon whether the groove is filled with an index-matching oil. The index-matching oil has a refractive index close to that of the waveguides. An optical signal transmitted through a waveguide is transmitted through the crosspoint when the groove is filled with the matching oil, but the signal changes its direction at the crosspoint through total internal reflection when the groove is empty. To change the cross-point switching arrangement, grooves must be filled or emptied. In the system taught in this patent, a "robot" fills and empties the grooves. A faster version of this type of TIR element is taught in U.S. Pat. No. 5,699,462 which utilizes thermal activation to displace liquid from a gap at the intersection of a first optical waveguide and a second optical waveguide. However, the switching speed of this device is still relatively slow, and hence the device is limited to applications in which switching speeds of tens of milliseconds are acceptable.

Prior art TIR elements with very fast switching times are also known. These elements alter the index of refraction of the material behind the boundary by applying an electric field to a material whose index of refraction is a function of the electric field. For example, U.S. Pat. No. 5,078,478 describes a TIR element in which the waveguide is constructed in a ferroelectric material. The index of refraction of the ferroelectric material along a boundary within the waveguide is altered by applying an electric field across a portion of the waveguide. While this type of device switches in nanoseconds, the change in index of refraction is very small, and hence, the direction of the light can only be altered by a few degrees. Deflections of this magnitude complicate the design of a cross-point array, and hence, commercially viable cross-connects based on this technology have not been forthcoming.

Broadly, it is the object of the present invention to provide an improved optical cross-connect switch.

It is a further object of the present invention to provide an optical cross-connect switch whose state may be switched faster than mechanically based systems.

It is a still further object of the present invention to provide an optical cross-connect switch that provides large angles of deflection.

These and other objects of the present invention will become apparent to those skilled in the art from the following detailed description of the invention and the accompanying drawings.

SUMMARY OF THE INVENTION

The present invention is an optical cross-connect switch for routing light signals between N input optical fibers and M output optical fibers. The switch includes an N×M array of optical switching elements, each optical switching element routing a light signal from one of the input optical fibers to one of the output optical fibers. Each optical switching element includes a layer of a switching material, first and second transparent electrodes overlying the layer of switching material, and a layer of hydrogen reservoir material adjacent to the layer of switching material. The switching material has first and second states. The switching material is transparent to the light signals in the first state, and the switching material reflects the light signals in the second state. The state of the switching material is determined by the concentration of hydrogen in the material. The hydrogen reservoir material supplies hydrogen to the switching material when a first potential difference is applied between the first and second electrodes and absorbs hydrogen from the switching material when a second potential difference is applied between the first and second electrodes. The switching material preferably includes a material chosen from the group. consisting of alkali, alkaline-earth, rare-earth metals, and the alloys and hydrides thereof.

DETAILED DESCRIPTION OF THE INVENTION

The present invention is based on hydrides of the alkali, alkaline-earth and rare-earth metals. These metals form hydrides on exposure to hydrogen gas. The hydrides are insulating compounds which are transparent if the layers are sufficiently thin. In the case of lanthanum and yttrium, the metals can exist in two hydride states, $MH_2$ and $MH_3$. The two hydride states can be easily converted from one to another by altering the hydrogen pressure. The di-hydride state has a partially filled conduction band, and hence, acts as a mirror. The tri-hydride state is a transparent insulator.

Figure 1:
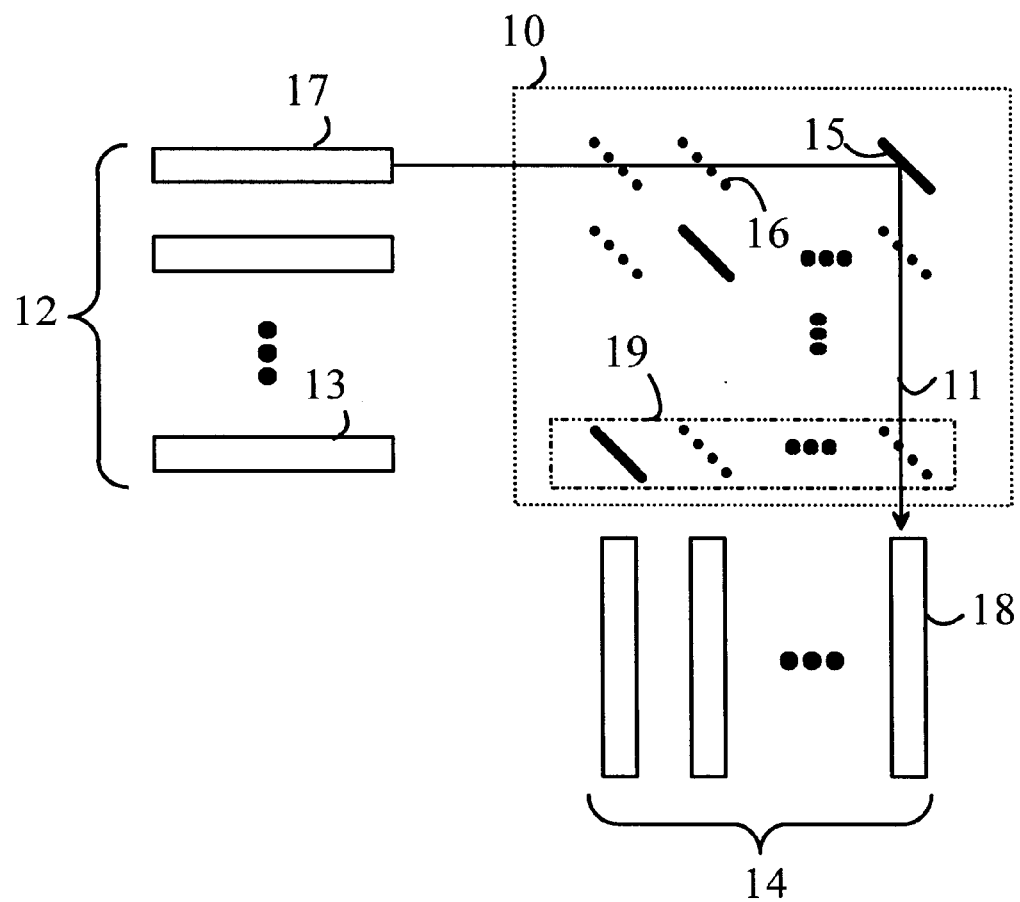
FIG. 1 is a cross-sectional view of an optical cross-connect according to the present invention.

The manner in which the present invention operates may be more easily understood with reference to FIG. 1 which is a cross-sectional view of an optical cross-connect switch 10 according to the present invention. Switch 10 forms optical connections between an array of input optical fibers shown at 12 and an array of output optical fibers shown at 14. Switch 10 is constructed from an array of switching elements. Exemplary switching elements are shown at 15 and 16. Switch 10 has one row of switching elements corresponding to each input optical fiber. The row of switching elements corresponding to input fiber 13 is shown at 19. The number of switching elements in each row is equal to the number of output optical fibers. Each switching element has two states, a "mirror" state in which the element behaves as a mirror that reflects a light signal incident thereon and a "transparent" state in which the element passes that light signal. Those switching elements that are in the mirror state are shown as solid lines in FIG. 1, while those switching elements that are in the transparent state are shown as dotted lines. Hence, switching element 15 connects input fiber 17 to output fiber 18 via path 11, while switching element 16 passes the light from input fiber 17 onto switching element 15.

Figure 2:
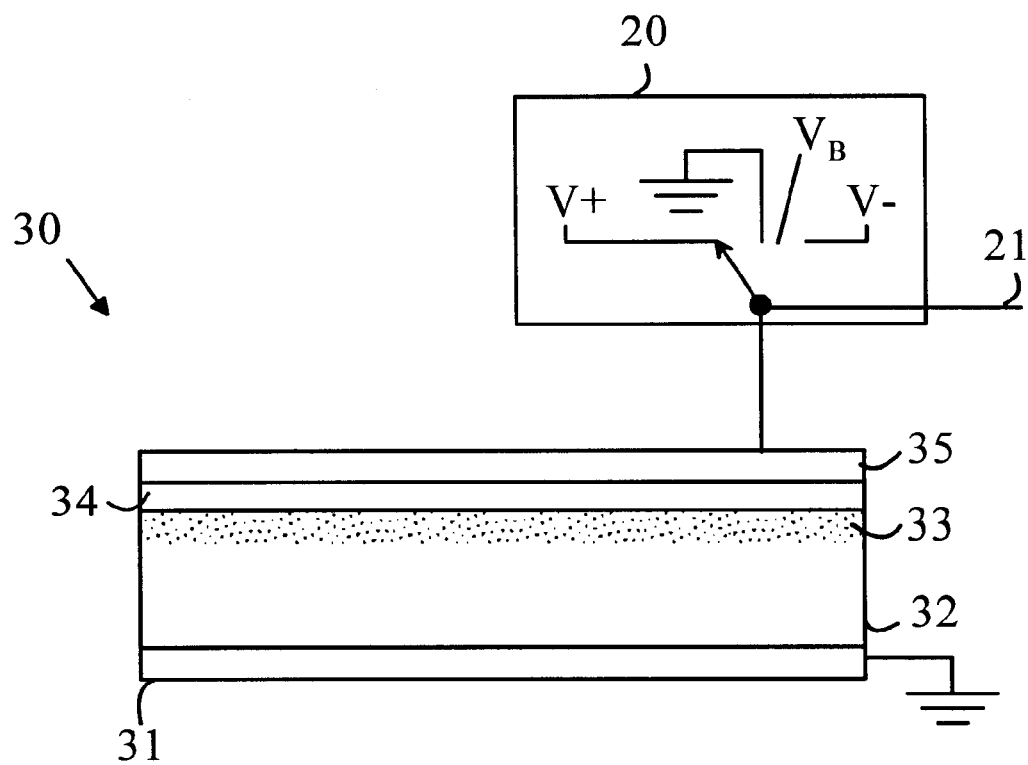
FIG. 2 is a cross-sectional view of a switching element 30 according to the present invention

The manner in which the switching elements are constructed can be more easily understood with reference to FIG. 2, which is a cross-sectional view of a switching element 30 according to the present invention. Switching element 30 includes a metal hydride layer 34 that is placed between transparent electrodes 32 and 35. A hydrogen source region 33 is placed next to metal hydride layer 34. When the potential of electrode 35 is negative relative to electrode 32, hydrogen ions move from source region 34 into metal hydride layer 34. When the potential difference is reversed, hydrogen ions leave metal hydride layer 34 and return to source region 33. A switching circuit such as circuit 20 is provided for each switching element, the switching circuit being controlled by a signal on a control line 21. With some metal hydrides, a bias potential, $V_B$, may be needed to hold the concentration of hydrogen in the hydride at a fixed level.

In the preferred embodiment of the present invention, each switching element also includes an anti-reflecting coating 31 to prevent light from being reflected from the surface of the switching element because of the difference in index of refraction of air and transparent electrode 32. Without such a coating a small fraction of the light incident on each transparent element would be reflected into an output fiber. Such signals would contribute to the noise levels in the output fibers, and hence, are to be avoided.

A number of metal hydrides may be used to construct the switching elements. For example, hydrides of lanthanum, gadolinium, and yttrium can be utilized. $LaH_2$ changes to $LaH_3$, and $YH_2$ to $YH_3$ upon the addition of hydrogen. In addition, the Mg alloys of such compounds may also be utilized. In the di-hydride state, these compounds are metallic. The tri-hydride state is insulating or semiconducting.

The transparent electrodes are constructed from transparent conductors such as indium tin oxide or from a suitably doped transparent semiconductor such as GaAs.

Various hydrogen sources can be used. The hydrogen source may be in the form of a jell, liquid, or solid. For example, 5M NaOH or KOH solution can be used in liquid or gel form. An ion implant of an amorphous layer of GaAs may also be utilized. An implant dose $>10^{15}$ hydrogen ions/cm$^2$ and an implant depth of about 100 nm may be used.

The above-described embodiments of the present invention utilize switching elements that are planar. However, it will be obvious to those skilled in the art from the preceding discussion that other shapes may be advantageously utilized. For example, each of the switching elements can be shaped as a parabolic reflector for imaging light from the corresponding input fiber to the output fiber associated with that switching element.

Various modifications to the present invention will become apparent to those skilled in the art from the foregoing description and accompanying drawings. Accordingly, the present invention is to be limited solely by the scope of the following claims.

What is claimed is:

1. An optical cross-connect switch for routing light signals between N input optical fibers and M output optical fibers, said switch comprising:

an N×M array of optical switching elements, each optical switching element routing a light signal from one of said input optical fibers to one of said output optical fibers, each optical switching element comprising a layer of a switching material, first and second transparent electrodes overlying said layer of switching material, and a layer of hydrogen reservoir material adjacent to said layer of switching material, said switching material having first and second states, said switching material being transparent to said light signals in said first state and said switching material reflecting said light signals in said second state, said state of said switching material being determined by the concentration of hydrogen in said material, said hydrogen reservoir material supplying hydrogen to said switching material when a first potential difference is applied between said first and second electrodes and absorbing hydrogen from said switching material when a second potential difference is applied between said first and second electrodes.

2. The optical cross-connect switch of claim 1 wherein said hydrogen reservoir medium comprises KOH.

3. The optical cross-connect switch of claim 1 wherein said hydrogen reservoir material comprises a transparent conductor implanted with hydrogen ions.

4. The optical cross-connect switch of claim 1 wherein said switching material comprises a material chosen from the group consisting of alkali, alkaline-earth, rare-earth metals, and the hydrides thereof.

5. The optical cross-connect switch of claim 1 wherein said optical switching elements comprise a planar surface for reflecting said light signal when said switching material is in said second state.

6. The optical cross-connect switch of claim 1 wherein said optical switching elements comprise a parabolic surface for imaging light from a corresponding input fiber into a corresponding output fiber when said switching material is in said second state.

* * * * *